Figure 1:
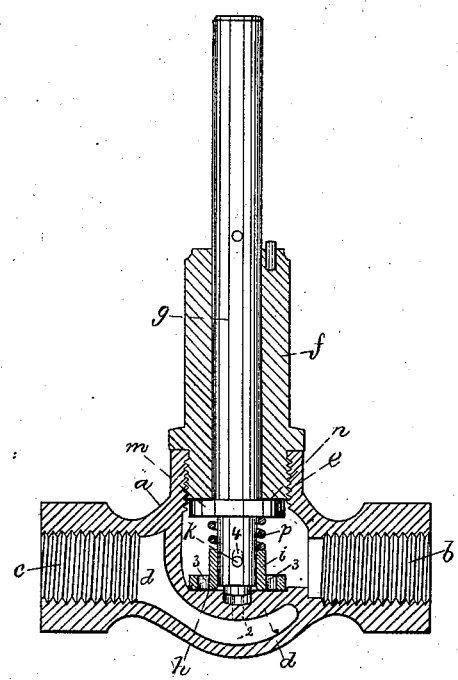

(No Model.)

J. M. GOLDSMITH.
VALVE.

No. 261,547. Patented July 25, 1882.

Witnesses.
Bernice J. Noyes.
John F. C. Prinkert

Inventor.
J. Mortimer Goldsmith by Crosby & Gregory
Attys.

N. PETERS. Photo-Lithographer, Washington, D. C.

UNITED STATES PATENT OFFICE.

J. MORTIMER GOLDSMITH, OF BOSTON, MASSACHUSETTS.

VALVE.

SPECIFICATION forming part of Letters Patent No. 261,547, dated July 25, 1882.

Application filed March 3, 1882. (No model.)

*To all whom it may concern:*

Be it known that I, J. MORTIMER GOLDSMITH, of Boston, county of Suffolk, State of Massachusetts, have invented an Improvement in Valves, of which the following description, in connection with the accompanying drawings, is a specification.

My invention relates to valves, and has for its object to produce a tight self-packing valve which requires but slight movement to open and close it.

The invention is shown as embodied in a globe-valve, or one in which a spherical chamber or valve-case is provided at its sides with inlet and outlet passages, which are separated by a diaphragm or partition having a passage which is controlled by the valve proper operated by a stem passing out through the said spherical case. In valves of this kind the said diaphragm or partition has usually been provided with an opening controlled by a valve which is raised from or depressed into the said opening to make or cut off the connection between the said inlet and outlet passages. In such construction the valve-stem requires a longitudinal movement, which is usually accomplished by a screw-thread, thus involving at the same time a rotary movement. The said valve-stem thus requires a stuffing-box or packing to keep it tight.

In the class of valves to which my invention belongs the partition or diaphragm which supports the inlet and outlet passages of the valve is provided with a seat containing one or more perforations, and the valve is made with corresponding perforations which may be brought in line with the said perforations in the seat to afford a passage, or may be removed from such position to close the passage by a sliding movement of the said valve upon its seat, which it never leaves. As herein shown, the faces of the valve and its seat are circular and the holes are made between the center and circumference, so that a slight rotary movement of the valve on its seat is sufficient to open and close the said valve.

In my improvement the valve is connected with its stem in such a manner as to be positively rotated therewith, so as to have a slight longitudinal movement thereon, and the valve-stem socket is provided at its end, within the globe or case of the valve, with a seat which co-operates with a flange upon the valve-stem to tightly close the said valve-stem socket and prevent any escape around the valve-stem, the said flange and its seat thus serving as a valve-stem packing. The valve-seat proper and seat for the packing-flange of the valve stem are opposite one another, and a spring is interposed between the said flange and the valve in such manner as to tend to separate them, and thus press both against their seats. The pressure of the fluid the passage of which through the valve-case is to be controlled also reacts between the valve proper and the packing-flange, tending to press each more tightly to its seat, and thus rendering the apparatus the tighter the greater the pressure that is brought to bear upon it. The wear of the parts has no tendency to reduce the tightness or efficiency of the valve.

Figure 2:
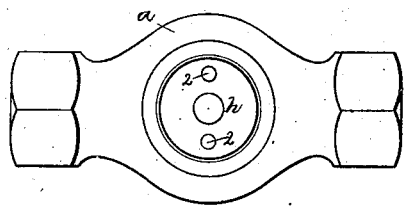

Figure 1 is a longitudinal section of a valve constructed in accordance with this invention; and Fig. 2, a plan view of the valve-case and seat, the valve-stem and valve proper being removed.

The valve-case $a$, as herein shown, is similar in construction to that of the well-known globe-valve, it being provided with an inlet-passage, $b$, and an outlet-passage, $c$, separated by a diaphragm or partition, $d$, in the globular part of the said case. It is also provided with a threaded passage, $e$, to receive the valve-stem socket $f$, (shown in this instance as a tubular guide-piece for the valve-stem $g$.) The partition or diaphragm $d$ is provided with a valve-seat, $h$, (see Fig. 2,) shown as plane and circular in shape, it being provided with one or more holes or passages, 2, which connect the space in the case $a$ at the opposite sides of the said partition. The valve proper, $i$, has its under face properly fitted to the said seat $h$, and is provided with holes 3, which, by the rotation of the said valve on its seat, may be brought into or removed from coincidence with the holes 2 in the partition $d$, to thus open and close the valve. The said valve $i$ is mounted on the stem $g$, with which it is so connected as to be positively rotated therewith, but to have a slight independent longitudinal movement thereon, it, for this purpose, being shown as provided with slots 4, one of which is shown in dotted lines, Fig. 1, which are engaged by a pin, *k*, passing through the valve-stem. The said valve-stem *g* is fitted in the socket-piece *f*, so as to be easily rotated therein, and is provided with a packing-flange, *m*, engaging a seat, *n*, at the inner end of the said socket *f*, the said flange acting as a valve to close the valve-stem passage through the said socket-piece, and thus tightly packing the said stem. A spring, *p*, interposed between the flange *m* and the valve *i*, tends to press both to their seats, and thereby aids the pressure of the fluid in keeping the valve always tight.

It will be seen that a slight rotary movement of the valve-stem *g* without any longitudinal movement is sufficient to wholly open or close the valve, and that the acting surfaces are always maintained in close contact as they wear away, the slot 4 in the valve *i* permitting the longitudinal movement necessary for adjusting the valve to its seat as it and the flange *m* wear in service.

It is obvious that any number of holes 2 3 in the valve and seat may be employed, provided only that they are of less area than the space between them. Where the valve is intended to control a very penetrating fluid—such as naphtha or a gas—the holes 2 will be small and a considerable distance apart, as shown, so that the fluid would have to traverse a considerable distance between the faces of the valve and its seat in order to escape when the valve is closed. Where a freer flow is desired and great tightness is not so essential—as, for example, if the valve were to be used as a throttle for a steam-pipe—the holes may be considerably larger and nearer together.

I claim—

1. The combination of the valve shell or case *a* and stem-socket *f* with the stem *g*, its socket-closing flange *m*, and the valve *i*, slotted and loosely connected to said stem by a pin or pins, *k*, substantially as shown and described.

2. The valve *i*, slotted and connected to its stem by a pin or pins, *k*, combined with the said stem, a flange, *m*, thereon, an intermediate spring, *p*, the valve shell or case *a*, and the valve-seat *d*, substantially as shown and described.

In testimony whereof I have signed my name to this specification in the presence of two subscribing witnesses.

J. MORTIMER GOLDSMITH.

Witnesses:
  Jos. P. Livermore,
  B. J. Noyes.